Figure 1:
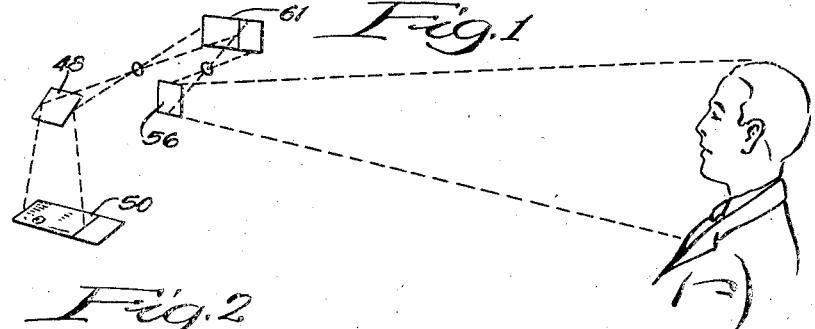

May 6, 1947.  C. LOEB  2,420,046
CAMERA FILM CUT-OFF AND STORAGE DEVICE
Filed Feb. 12, 1944  3 Sheets-Sheet 1

Inventor.
Carl Loeb,
By Dawson, Ooms & Booth,
Attorneys.

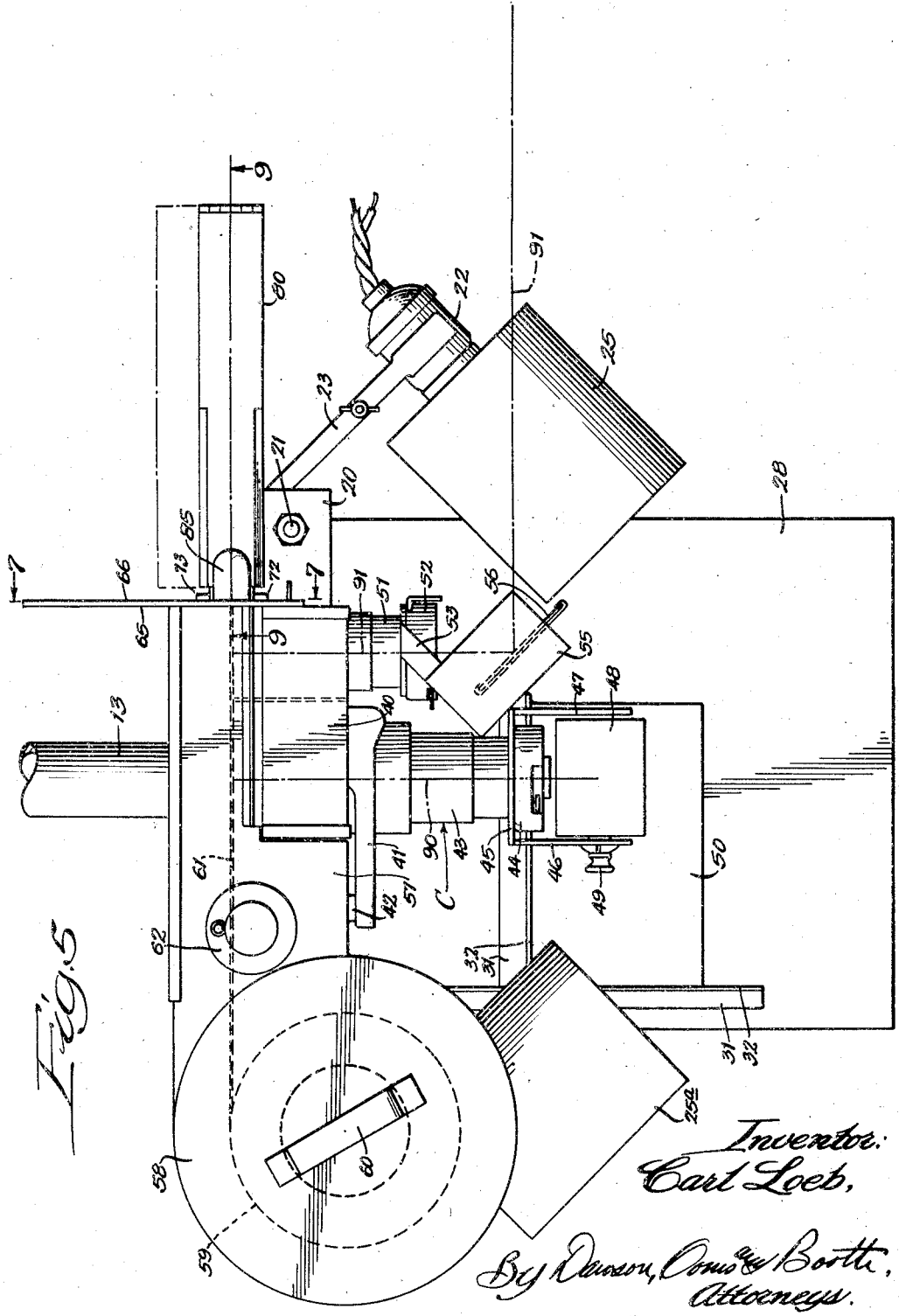

May 6, 1947.  C. LOEB  2,420,046
CAMERA FILM CUT-OFF AND STORAGE DEVICE
Filed Feb. 12, 1944  3 Sheets-Sheet 3
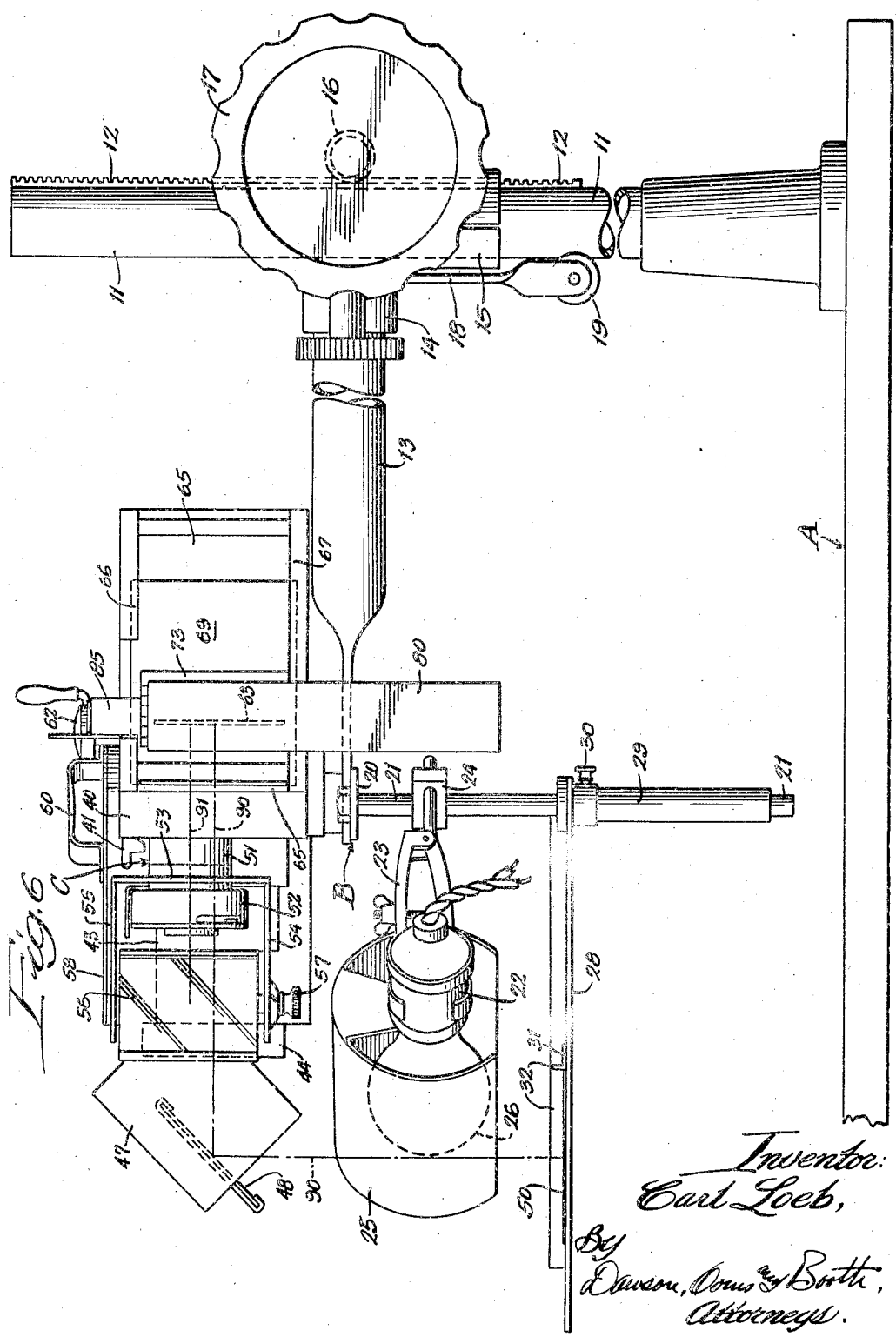
Inventor:
Carl Loeb,
By Dawson, Ooms and Booth,
Attorneys.

Patented May 6, 1947

2,420,046

UNITED STATES PATENT OFFICE 2,420,046

CAMERA FILM CUTOFF AND STORAGE DEVICE

Carl Loeb, Chicago, Ill.

Application February 12, 1944, Serial No. 522,033

4 Claims. (Cl. 95—31)

This invention relates to a photographic device, and more particularly to a device for recording data or written matter along with the picture of an individual on a single photo-sensitized surface.

In many instances, it is necessary to keep records of a number of individuals and it is desirable to have in a single record not only the photograph of the individual, but certain identifying data, such as a fingerprint, information as to birth date, color of eyes and hair, etc.

Accordingly, it is an object of this invention to provide a device by which such a record can easily be made. More specifically, it is an object to provide a device by which the image of a person may be reproduced along with a copy of a data sheet containing information concerning the person on a single strip of film or photo-sensitized material without resetting or focusing the camera for each of these subjects.

Another object is to provide such a device which may be adjusted to accommodate persons of different stature without altering the position of the camera with respect to the data sheet so as to eliminate the necessity for adjusting the height of the camera or adjusting a light source when it is necessary to raise or lower the camera for different individuals.

Another object is to provide a device for recording images which can employ positive film or paper, that is, film or paper which when developed will show dark shadows and light highlights, while at the same time presenting the image in its proper relation, that is, with the right portions of the recorded image being the same as the right side of the subject viewed by the eye. Ordinarily, when a positive film is used in direct photography, the recorded image will be reversed, the various parts of the image appearing as they would in a mirror and not as viewed by the eye, and such effect is sought to be avoided in the present invention.

Another object of the invention is to provide a device having improved structure for handling the exposed material so that it may be easily and quickly taken from the device for developing. More specifically, it is desired to provide a receiving box which automatically receives the exposed material when it moves through the camera and which may be moved to sever the material and hold the same in a separate housing out of exposure to light until it can be removed for development. The light-proof or tight housing may be removed independently from the camera portion for transfer to the dark room for processing or development.

Further objects and advantages will be apparent as the specification proceeds.

An embodiment of the invention is illustrated in the accompanying drawings, in which—

Figure 2:
Figure 3:
Figure 4:
Figures 7, 8, 9:
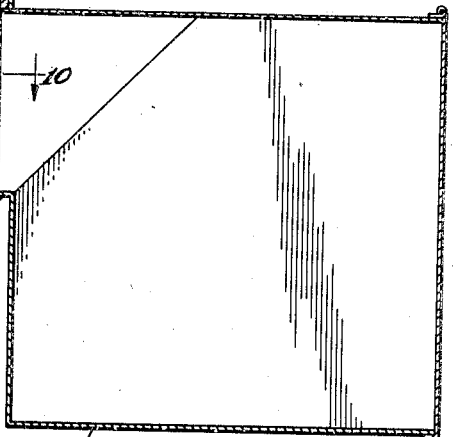
Figure 10:
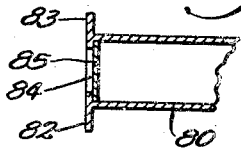

Fig. 1 is a diagrammatic illustration of the principle of the improved device; Fig. 2 is a view showing the face of a data card or sheet which may be recorded by the improved device; Fig. 3 is a view showing the record made by the improved device with both the information on the data sheet and the subjects photographed contained in the record; Fig. 4 is a view showing another type of record which may be made with the improved device, this type including the information on the data sheet and both front and profile photographs of the subject; Fig. 5 is a plan view of the improved device; Fig. 6 is an elevational view of the device; Fig. 7 is a detail view in elevation showing the means for severing the film, the view being taken as indicated at line 7—7 of Fig. 5; Fig. 8 is a sectional detail view taken as indicated at line 8—8 of Fig. 7; Fig. 9 is a longitudinal sectional view of the film-receiving box, the view being taken as indicated at line 9—9 of Fig. 5; and Fig. 10 is a detail sectional view taken at line 10—10 of Fig. 9.

As illustrated, the device includes a base or supporting structure A, frame B, and a camera mechanism C.

The base A may be of any suitable form or construction, and in fact may be a table or floor. Extending upwardly from the base A is a standard 11, and the frame A is adjustably supported on the standard 11 by means of rack and gear means, the standard being provided on its one side with the rack 12.

The frame B includes a lateral arm 13 which at its one end is provided with a fitting 14 including a sleeve 15 which engages the standard 11. The gear 16, carried by this fitting and engaging the rack 12, is operated by the hand wheel 17, so that when the wheel 17 is turned, the arm 13 and therefore frame B are raised or lowered. A supporting finger 18 is carried by the fitting 14 and has at its end a wheel 19 which bears against the standard 11 so as to steady the frame as it is raised or lowered through the action of the gear and rack.

Returning to the frame B, the other end of the arm 13 is secured to the cross member 20 which supports the camera C. At one end, the cross member 20 is provided with a depending member 21 to which the lamp 22 is secured by means of the clamp 23 and adjustable mounting 24. Mounting 24 may be loosened so as to permit the lamp to be raised or lowered along the member 21. The lamp is provided with a shield 25 which guards the camera from the direct light of the bulb 26. A second lamp 25a may also be provided to light the card from the other direction.

The horizontal shelf or supporting table 28 is adjustably supported on the member 21 by means of the sleeve 29 extending about member 21 and provided with the set screw 30. By adjusting the position of the sleeve along the member 21, the vertical position of the shelf may be adjusted with respect to the camera. Suitably, the shelf 28 may be provided with the guides 31 and 32 for marking out the position on the shelf where the card or data sheet may be placed so as to be properly within the view of the camera.

The camera mechanism C includes the camera dark box 40 which is held in position by the lever 41 which is pivoted at 42 and is adapted to confine the box at its other end. Extending from the box 40 is an adjustable tube 43 which terminates with the shutter and lens mechanism 44. Mounted on the shutter structure is a bracket 45 which carries the side blinds 46 and 47 and the mirror 48 located between these blinds. The mirror is so positioned that light rays coming upwardly from a data card 50 supported on the table 28 will be reflected sideways into the lens and shutter structure 44. The knob 49 permits adjustment of the mirror 48 to obtain the correct direction of light transmission.

Also extending from the box 40 of the camera is a second tube extension 51 which terminates in the shutter and lens mechanism 52. Secured to this shutter device is the bracket 53 which carries the side blinds 54 and 55 between which is mounted the mirror 56 controlled by knob 57. Mirror 56 is so positioned as to direct light coming from a vertical subject in front of the device into the lens and shutter mechanism 52.

The camera casing includes along with the box 40 the casing channel 57 which has at its far end a cylindrical portion 58. The portion 58 contains a roll of unexposed film or photo-sensitized material 59, and at its top is provided with a handle 60 by which the camera may be lifted. The film 61 coming from the roll 59 is propelled by a roll turned by the crank 62. The film passes through the rear end of the box 40 so as to be exposed to the rays of light coming from the lenses 45 and 52 and passes out of box 40 at the slot 63.

The film or paper used is preferably of the positive type which when developed shows a positive image instead of a negative image. The term "film" as used herein is intended to include any flexible photo-sensitized sheet material of the positive type.

The mechanism for cutting and removing exposed strips of film or paper is more clearly illustrated in Figs. 6 to 10. As shown in Fig. 8, the camera box 40 is provided with the slot 64 through which the film may pass from the camera. A slide-receiving structure 65 is attached to the camera and is provided with the top and bottom lips 66 and 67. A slot 68 in this structure registers with the slot 64 of the camera box. A slide 69 is received in the structure 65 and is retained by the lips 66 and 67 at the top and bottom, and is adapted to slide laterally within the structure 65. The slide 69 has an opening 70 which at one position of the slide is aligned with the slot 64 so that the film passes out through slots 64 and 68 and then through the opening 70 of the slide. One side of the opening 70 is beveled so as to provide a knife 71 for severing the film when the slide is moved to break the alignment of the opening 70 with the slot 68. Also, as will be seen more clearly in Fig. 7, the opening 70 is wider at the bottom than at the top so that as the slide is moved laterally the knife 71 will first engage the film to be severed at the top edge, and as the slide moves further the film will be sheared towards the bottom.

The slide 69 is provided with a pair of lip-engaging members 72 and 73 on each side of the opening 70, and these members serve to hold the film-receiving box 80 in position to receive the film from the camera.

The film-receiving box is more clearly illustrated in Figs. 9 and 10. This box may be of substantially rectangular shape having a mouth portion 81 which has the outwardly-extending lips 82 and 83 (see Fig. 10) and the central opening 84. A slide member 85 extends downwardly from the top of the box behind the lips 82 and 83 and is for the purpose of closing the opening 84 when the box is to be removed from the camera with exposed film therein so as not to permit light to enter the box. This slide member is intended to be raised out of registry with the opening 84 when the camera is in use.

The box 80 may be mounted by passing the lips 82 and 83 of the box down behind the lip-engaging members 72 and 73 of the slide-receiving member 65. Any suitable stop may be provided to hold the box in the proper vertical position and prevent its passing downwardly too far.

In setting up the device for use in connection with a large number of subjects, the shelf 28 may be adjusted on the frame so that with the size of data card being employed the image transmitted to the film will be of the proper size and the tube 43 is adjusted as to length so as to bring the card into proper focus, the lamps 25 properly set to throw the desired amount of light on the data card, and the shutter properly adjusted. Then no further adjustment of this mechanism need be made so long as the same type and size of data card is used.

The camera may also be adjusted at the shutter mechanism 52 to focus properly on the subject sitting or standing in front of the camera. For succeeding exposures of different persons, it will usually not be necessary to adjust the camera except to raise and lower the apparatus to accommodate persons of different height, as will later be explained.

In the use of the improved device, the operator may place a data card similar to that illustrated in Fig. 2, properly filled out containing data regarding the person who is to be photographed, including his signature and fingerprint, on the shelf 28. Then with the person in front of the camera device, both shutters are snapped. This operates to record on a single film the data which is on the card and also the person's photograph. The light reflected from the card is again reflected by the mirror 48 and thus turned approximately 90° directly into the lens and shutter mechanism 44, the light passing through the camera and onto the film at the back of the box 40. This path of light is indicated in the drawings by the dotted line 90. The light reflected from the person in front passes, as indicated by line 91 in the drawings, to the mirror 56 and is reflected by the mirror, being turned approximately 90° to the right, directly into the lens and shutter mechanism 52, from which it passes through the camera striking the film at the rear.

After the film has been thus exposed, the operator may turn the crank 62 to advance fresh film from the roll 59 in place for a new record to be made and at the same time advance the exposed portion of the film out of the camera through the slot 64. The slot 64 is in registry with the slot 68 of the mounting structure and also with the openings 70 of the slide and opening 84 at the mouth of the film-receiving box 80, so the film passes out of the camera through slots 64 and 68 and openings 70 and 84 into the receiving box.

With the end of the film extending into the film-receiving box, the box may be pushed laterally to one side, as indicated by dotted lines in Fig. 5, moving the slide 69 in the slide-receiving structure 65. This operates to sever the film by a shearing action as previously described, and the cut film carrying the record drops down in the box. The box may then be moved back into its original position, as shown in full lines in Fig. 5, and another record taken in the same manner.

At any time the box is moved to the lateral position, it may be closed by pushing down the slide 85 to close the opening 84 and then the box may be lifted out of engagement with the slide 69 and the lip-engaging members 72 and 73. It will be noted from Fig. 7 that the upper lip 66 is cut away at 89 to permit the box to be removed in this way when in lateral position, but that the box cannot be so removed when it is in position to receive film from the camera.

After development of the film contained in the box, or after the exposed film has been removed, the box may be again placed in position on the slide and moved laterally back to its original position for receiving further strips of exposed film. By this arrangement, the film may be removed after each exposure is made, or the box and slide may be moved back and forth between exposures, cutting the film in strips representing individual records which accumulate in the box until it is desired to removed them for development.

By the operation above described, the record may be something like that illustrated in Fig. 3 of the drawings, with the data on the left of the film strip and the front view photograph on the right. A modified kind of record, such as that shown in Fig. 4, may also be made with the improved device. To make a record of this type, the operator proceeds as described above to record the information on the data sheet together with the front view photograph of the subject. Then the subject is turned about 90° and the film advanced a normal amount as would be done for a second record of the same type, but this time only the shutter passing light from the person is operated. In this way, the profile view of the person is recorded at the left of the data information, as indicated in the record card illustrated in Fig. 4. However, with this operation it is then necessary to advance the film only one-half the normal amount for the next record.

If the next subject to be photographed is taller than the last one, it is necessary only for the operator to turn the hand wheel 17 counterclockwise so as to raise the frame with respect to the base and so bring the subject into proper view of the camera. It will be noted that when the frame is thus raised or lowered, the shelf 23 and the lamps 25 and 25ᵃ are also raised or lowered the same amount, so that the focus or amount of light with respect to the card data is not disturbed.

Although the invention has been described in connection with a single embodiment only, it is expected that the principles of the invention may be practiced in connection with many embodiments and that many changes may be made all within the spirit of the invention.

I claim:

1. In a record-making device, a camera, means for passing film through said camera so as to permit exposure of the film to light passed through the camera, said camera having a slot through which the exposed film may pass therefrom, a slide receiving structure secured to said camera, a slide received within said structure and having an opening therein which in one position of said slide is aligned with said slot, one side of said opening being provided with a knife member which is adapted to sever film extending through the opening as the slide is moved within the structure, and a film-receiving box detachably mounted on said slide having an opening aligned with the opening in said slide, the opening in said box being closed to light by said structure when the box is moved with said slide to a position wherein the slide opening is not aligned with said slot.

2. A record-making device as set forth in claim 1 in which said box is equipped with means for closing the opening in said box when the box has been moved to said position so that this opening will not admit light to the box after it has been detached from said slide.

3. In a record-making device, a camera, a roll of light-sensitive material, means for passing said roll through said camera so as to permit exposure of the material to light passed through the camera, a slide-receiving structure in light-excluding contact with said camera, a slide within said structure containing an opening therein through which said roll of material is passed, a box detachably carried by said slide and provided with an opening to receive the exposed light-sensitive material from the opening in said slide, the opening in said slide having one side provided with a knife which is inclined with respect to the surface of said roll of material whereby said material is severed progressively from one edge to the other as said slide is moved laterally within said structure, the opening in said camera being closed to light by said slide when the slide is moved to cut off said light-sensitive material.

4. In a record-making device, a camera, a roll of light-sensitive film, means for passing said film through said camera so as to permit exposure of the film to light passed through the camera, a slide-receiving structure adjacent said camera, a slide within said structure, a box detachably carried by said slide and provided with an opening adapted to receive exposed film from said camera, and means for cutting off a strip of film extending into said box through movement of said slide within said structure, the opening in said camera being closed to light by said structure when the slide is moved to cut off said strip of film.

CARL LOEB.

REFERENCES CITED

The following references are of record in the file of this patent:

UNITED STATES PATENTS

| Number | Name | Date |
|---|---|---|
| 2,125,388 | Monroe | Aug. 2, 1938 |
| 2,339,657 | Smith | Jan. 18, 1944 |
| 2,345,225 | Walsh et al. | Mar. 28, 1944 |
| 1,645,590 | Ernst | Oct. 18, 1927 |
| 1,791,207 | Hindle | Feb. 3, 1931 |
| 1,940,187 | Salchow | Dec. 19, 1933 |
| 1,475,006 | Faber | Nov. 20, 1923 |
| 1,795,050 | Simjian | Mar. 3, 1931 |

FOREIGN PATENTS

| Number | Country | Date |
|---|---|---|
| 308,273 | Italian | May 31, 1933 |